United States Patent Office 3,755,502
Patented Aug. 28, 1973

3,755,502
BLENDS OF POLYOLEFINS WITH ISOBUTENE-DIPENTENE COPOLYMER AND FILMS THEREFROM
Edward M. Bullard, Rochester, N.Y., assignor to Mobil Oil Corporation
No Drawing. Filed Feb. 19, 1971, Ser. No. 117,145
Int. Cl. C08f 29/12
U.S. Cl. 260—897 A
2 Claims

ABSTRACT OF THE DISCLOSURE

A normally solid resinous blend composition, adaptable for fabrication into oriented film structures having improved physical properties, comprising a thermoplastic resin including polyolefins such as polypropylene and blends of polypropylene with other polyolefinic materials including copolymers, having incorporated therein additive amounts, on the order of from about 5% to about 40% by weight of a copolymer of dipentene and isobutene.

BACKGROUND OF THE INVENTION

Field of the invention

The present invention relates to resinous thermoplastic compositions adapted for use in the production of oriented thermoplastic film materials such as monoaxially or biaxially oriented polypropylene and in addition resinous blend compositions comprising polypropylene in admixture with copolymers such as, for example, ethylene-butene copolymers. Specifically, uncoated oriented films formed from the resinous materials above defined have relatively high heat sealing temperatures, in comparison to many of the commercially available thermoplastic films such as, for example, polyethylene film which have an extremely narrow heat seal range. Moreover, such oriented films exhibit a tendency to disorient, shrink, and tear when attempts are made to seal these films at their prerequisite heat seal temperatures. In accordance with the present invention, this problem is ameliorated by incorporating in the resin additive amounts on the order of about 5% to about 40% by weight, based upon the total weight of the resin to be modified, of a copolymer of dipentene and isobutene, the respective monomer concentrations of this copolymer being about a 50—50 mol percent ratio (65.7% by weight dipentene; 34.3% by weight isobutene).

This additive material is incorporated into the resin to be modified utilizing conventional techniques and the additive-containing resin is subsequently extruded utilizing either a slot or tubular type die and initially formed into an oriented thermoplastic film structure utilizing conventional film orientation techniques. It has been found that when the aforedescribed dipentene and isobutene copolymer additive is blended with the thermoplastic resin in the above-described additive amounts, it substantially lowers the minimum heat seal temperatureture of such oriented film products and, additionally, the additive-containing oriented film exhibits improved optical properties as well as increased tensile modulus, i.e., stiffness, which latter property improves the processability of such oriented film material on automatic packaging equipment.

Description of the prior art

In the past, attempts to remedy the hereinbefore discussed defects of oriented thermoplastic film and specifically efforts to improve the heat-seal characteristics and increase the heat-seal range thereof, have included the application of various types of coatings to the oriented film and multipolymers. Although in some instances, such coating application resulted in an oriented film which exhibited satisfactory heat-seal properties, such coating techniques are time consuming and costly, involving the formulation of special coating materials, treatment of the film surface to be coated utilizing, for example, electronic treatment, and in some instances even priming of the treated film surface with material such as, for example, polyethyleneimine to insure adequate adhesion of the topcoating to the oriented film substrate. In many instances such polymer coatings have deleterious effects on the final coated film product such as resulting in the coated film exhibiting poor blocking characteristics.

Other prior art attempts to improve the heat-seal characteristic of oriented thermoplastic films included the employment of various additive materials, which, when incorporated in the thermoplastic resin prior to conversion thereof into an oriented film structure, are intended to improve the heat-seal characteristics of the film. U.S. Pat. Nos. 3,278,646, 3,313,754 and 3,463,752 are characteristic of the prior art disclosures relating to the employment of additives to improve the properties of oriented thermoplastic films. Applicant has found that when such prior art additives are employed to alter the oriented film properties, undesirable effects are obtained in the final film, such as film discoloration and an undesirably higher coefficient of friction for example. Also, it has been found that ecrtain of these prior art film additives will increase the blocking tendency of oriented films.

SUMMARY OF THE INVENTION

In accordance with the present invention resinous compositions are provided which may be employed in the fabrication of oriented thermoplastic film structures such as for example oriented polypropylene film as well as blends thereof with other thermoplastic materials including for example copolymers such as ethylene-butene copolymers. Such films fabricated from the resinous compositions of the present invention exhibit lower heat seal temperatures, broaden heat seal temperature ranges, improved optical properties, and increased tensile modulus in comparison to a prior art oriented film structures which do not contain applicant's modifying additive. The compositions of the present invention comprise polypropylene resin and blends of polypropylene with ethylene-butene copolymers containing additive amounts, from about 5 up to about 40% by weight, based upon the total weight of resin, of a copolymer of dipentene and isboutene, the monomer concentration of dipentene in the copolymer being 50 mole percent (65.7% by weight) and the remainder isobutene.

DESCRIPTION OF SPECIFIC EMBODIMENTS

Varying amounts of a commercially available, normally solid thermoplastic resinous copolymer of dipentene and isobutene, in about a 50—50% mole ratio, which is an addition polymer having recurring units (n) with the following structural formula;

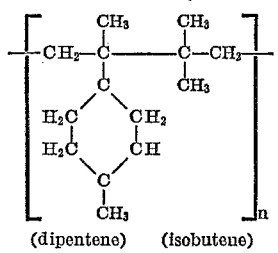

(dipentene) (isobutene)

and having the following properties:

| | |
|---|---|
| $T_g$ (glass transition temperature) | 82° C. |
| Refractive index | 1.526. |
| Ash content | 0.064%. |
| Elemental analysis: | |
| C | 89.5%. |
| H | 10.5%. |
| Decomposition temperature | 300° C. |
| Color | Pale yellow. |
| Softening point | 115° C. to 125° C. |
| Molecular weight | 3,100 (weight average). |
| Molecular weight | 1,230 (number weight). | were admixed with molten polypropylene resin identified by the manufacture as Eastman Tenite 423-DF, a high isotactic content, crystalline polypropylene having the following properties:

| | |
|---|---|
| Melt index | 4.5 |
| Crystalline melting point, ° F. | 330 |
| Inherent viscosity | 1.4–1.6 |
| Molecular weight | 100,000–120,000 |
| Density (grams/cc.) | 0.902 |
| Vicat softening point ° F. | 293 |

The polypropylene dipentene-isobutene copolymer blends were prepared by fluxing the polypropylene resin at 200° C. in a Brabender Plasticorder for 5 minutes to achieve complete melting of the resin. The dipentene-isobutene is added slowly and the mixture is mixed for 30 minutes under a nitrogen blanket.

Following the compounding procedure hereinabove described, the admixture was molded into plaques approximately 25 mils thick. The individual plaques were biaxially oriented at temperatures within the range of from about 280° F. up t about 310° F., by stretching the monoaxially oriented plaque, in a direction perpendicular to the first stretch direction, about 600%. The final gauge of the additive containing biaxially oriented film samples was about 1 mil.

In the following Table I, various physical properties of the additive containing, biaxially oriented films, produced in accordance with the above-described procedure are given and compared to a biaxially oriented polypropylene film containing no dipentene-isobutene copolymer. The percentage levels of dipentene-isobutene copolymer additive are expressed as percent by weight based upon the total weight of the additive containing sample.

TABLE I

| Percent by weight additive | 0 | 10 | 20 | 30 | 40 |
|---|---|---|---|---|---|
| (1) Coefficient of friction | .37 | .37 | .31 | .38 | .37 |
| (2) Haze, percent | 1.0 | 1.4 | 2.0 | 4.3 | .9 |
| (3) Gloss, percent | 87.3 | 90.5 | 88.0 | 87.5 | 93.4 |
| (4) Impact strength (72° F.) | 19.1 | 17.1 | 6.8 | 2.9 | 7.4 |
| (5) Modulus: | | | | | |
| MD (MPSI) | 272 | 319 | 222 | 362 | 386 |
| TD (MPSI) | 497 | 651 | 471 | 522 | 595 |
| (6) Blocking (grams per linear inch) | 0.2 | .9 | 1.9 | 4.6 | 5.6 |

Note.—Test designations: (1) ASTM D-189463; (2) ASTM D-1003-61 (3) ASTM D-245-65T.

It will be seen from the foregoing Table I, that the additive containing oriented polypropylene films of the present invention exhibit higher modulus, i.e., stiffness, in comparison to oriented polypropylene films containing no additive, i.e., no dipentene-isobutene copolymer.

In the following Table II, the results of a series of heat seal tests that were performed on film samples, identical to the samples tested in preceding Table I, are given. The seals were made utilizing pressures of 20 p.s.i. and a dwell time of 0.5 second. The values of the heat seals obtained are expressed in grams per linear inch. The heat seals were measured by sealing together two pieces of the additive containing oriented polypropylene film at temperatures indicated in Table II. The values given expressed in grams per linear inch represent the force required to separate the sealed film layers at a rate of about 12″ per minute utilizing a Suter heat seal tester.

TABLE II

| | Seal strengths | | | |
|---|---|---|---|---|
| Sealing temperature, °F | 220 | 240 | 260 | 280 |
| Percent by weight additive:[1] | | | | |
| 0 | 0 | 5 | 24 | |
| 10 | 38 | 39 | 119 | 99 |
| 20 | 45 | 126 | 171 | 192 |
| 30 | 59 | 117 | 200 | 410 |
| 40 | 37 | 115 | 336 | 415 |

[1] Dipentene-isobutene copolymer.

As shown, in preceding Table II, the film samples which contained no additive had extremely poor heat seal values at seal temperatures which produced excellent seal values for the additive modified polypropylene film samples of the present invention. When attempts were made to obtain satisfactory heat seals on the oriented polypropylene film containing no additive, by increasing the heat seal temperature to about 280° F., the film shrank and tore as a result of the disorientation caused by such an elevated temperature.

In another specific embodiment of the novel resinous compositions and oriented film structures of the present invention, additive amounts of the hereinbefore described dipentene-isobutene copolymer was added to a blend composition comprising polypropylene (Eastman Tenite 423-DF) with an ethylene-butene copolymer. It was found that, as illustrated in the following Table III, when oriented films were fabricated from such additive containing resinous blend composition, such films exhibited improved heat sealability properties as well as higher tensile modulus and improved optical properties.

The ethylene-butene copolymers, which may be employed in the fabrication of oriented film compositions of this invention are copolymers of ethylene and butene-1 containing from about 1 weight percent to less than 10 weight percent ethylene. Such copolymers, when blended with polypropylene resin and formed into films which are then oriented, exhibit properties which made them suitable for employment as shrink film materials. In particular such oriented film structures exhibit substantial area reduction ratios and high shrink energies when exposed to elevated temperatures on the order of about 200° F. and above.

In a specific embodiment of the additive modified polypropylene/ethylene-butene copolymer resin compositions and films, contemplated within the scope of the present invention, a mixture of 85-15 weight percent homopolymer and copolymer respectively are blended together utilizing a Banbury mill. The resinous blend is then admixed with about 10% by weight of the aforedescribed dipentene-isobutene copolymer additive. Oriented film structures were then prepared from the additive containing resinous blend compositions utilizing the technique hereinbefore described.

The ethylene-butene copolymer component employed had a melt index at 190° C. of 0.2 to 0.3, a methylene absorption value of 0.014, an ethylene content of from about 3 to about 6% by weight, and a melting point of 96° C. (differential thermogram).

TABLE III

[Biaxially oriented film of polypropylene/ethylene butene-1 copolymer (85% by weight)/(15% by weight)]

|  | With dipentene-isobutene copolymer additive (10% by weight) | Without dipentene-isobutene copolymer additive |
|---|---|---|
| Coefficient of friction | 1.41 | 2.70 |
| Haze | 0.7 | 1.5 |
| Gloss | 88.9 | 78.9 |
| Impact strength at 72° F | 16.4 | 12.8 |
| Tensile modulus (p.s.i.): | | |
| M.D. | 251 | 245 |
| T.D. | 400 | 266 |
| Blocking | 1.2 | 10 |
| Heat seal (° F.) low pressure, 1/4 p.s.i., 2 sec.: | | |
| 200 | 16 | 12 |
| 220 | 23 | 24 |
| 240 | 30 | 34 |
| 260 | 59 | 41 |
| 280 | 63 | 44 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A thermoplastic resin composition comprising a mixture of a member selected from the group consisting of isotactic, crystalline polypropylene and blends of isotactic crystalline polypropylene with an ethylene-butene-1 copolymer, said mixture containing from about 5% up to about 40% by weight, based upon the total weight of said mixture, of dipentene-isobutene copolymer containing about 50 mole percent of each constituent.

2. An oriented thermoplastic film containing additive amounts of from about 5% to about 40% by weight of a dipentene-isobutene copolymer containing about 50 mole percent of each constituent, said oriented thermoplastic film comprising a member selected from the group consisting of isotactic, crystalline polypropylene and blends of isotactic, crystalline polypropylene with ethylene-butene copolymers.

References Cited

UNITED STATES PATENTS

| | | | |
|---|---|---|---|
| 3,278,646 | 10/1966 | Lambert | 260—897 |
| 2,373,706 | 4/1945 | Ott | 260—80 |
| 3,361,849 | 1/1968 | Cramer et al. | 260—897 |
| 3,220,966 | 11/1965 | Flanagan | 260—27 |
| 3,372,049 | 3/1968 | Schaffhausen | 117—7 |
| 3,254,139 | 5/1966 | Anderson et al. | 260—897 |

MURRAY TILLMAN, Primary Examiner

C. J. SECCURO, Assistant Examiner

U.S. Cl. X.R.

264—289